Feb. 8, 1966 L. E. PEARSON 3,234,466

WAVE SIGNAL RECEIVER

Filed Aug. 31, 1962

INVENTOR.
LEONARD E. PEARSON
BY Mueller and Aichele
ATTYS.

3,234,466
Patented Feb. 8, 1966

3,234,466
WAVE SIGNAL RECEIVER

Leonard E. Pearson, Western Springs, Ill., assignor to Motorola, Inc., Chicago, Ill., a corporation of Illinois Filed Aug. 31, 1962, Ser. No. 220,722
3 Claims. (Cl. 325—318)

This invention relates to transistorized wave signal receivers and more particularly to a circuit for such receivers to reduce spurious signal response therein.

Certain types of transistorized radio receivers have been found to exhibit poor spurious signal rejection in that they produce oscillation, "tweets," and undesirable signals of higher frequency than the tunable band of the receiver. This condition is of particular concern in a broadcast band receiver having both limited input selectivity, for example, in a receiver having one tuned circuit between the antenna and a transistor converter, and a power line rectifier circuit to supply a direct current operating potential for the receiver. Such a problem of spurious signal response may be caused by intermodulation of undesired signals with other signals or the establishment of an unexpected tuning circuit in the receiver input, or by mixing of undesirable signals with signals present in the converter when the input selectivity is relatively low and power line coupling and pickup may introduce unusual undesirable signal strength.

An object of this invention is to overcome the above described problem and to reduce spurious signal response in a transistorized radio receiver.

Another object is to improve the tuning response of a power line operative transistor receiver having a converter stage directly coupled to an antenna.

Simple tests indicate that when a transistorized receiver is conductively connected to a ground circuit, for example, to an alternating current power line through the receiver power supply, then the amplitude of interfering signals appearing at the input of the receiver, that is the antenna circuit, is much greater than when the receiver is operating solely from a battery power supply with no conductive connection to the power line.

In this invention resistance is introduced in the base circuit of the input or converter transistor so that when the receiver is connected to the power line, attenuation of high frequency interference signals is obtained by introducing high frequency roll-off at the input of the transistor.

In a particular form a transistorized converter in a superheterodyne receiver is connected through a resistor to the input transformer, or the antenna pickup secondary winding, thereby to reduce the high frequency response of the transistor and to avoid the production of oscillation, tweets, and the like. With such a converter input circuit, spurious signal response is reduced despite a single signal selective circuit for the desired signal applied to the receiver, and the use of a power line rectifier circuit for energizing the receiver.

Figure 1:
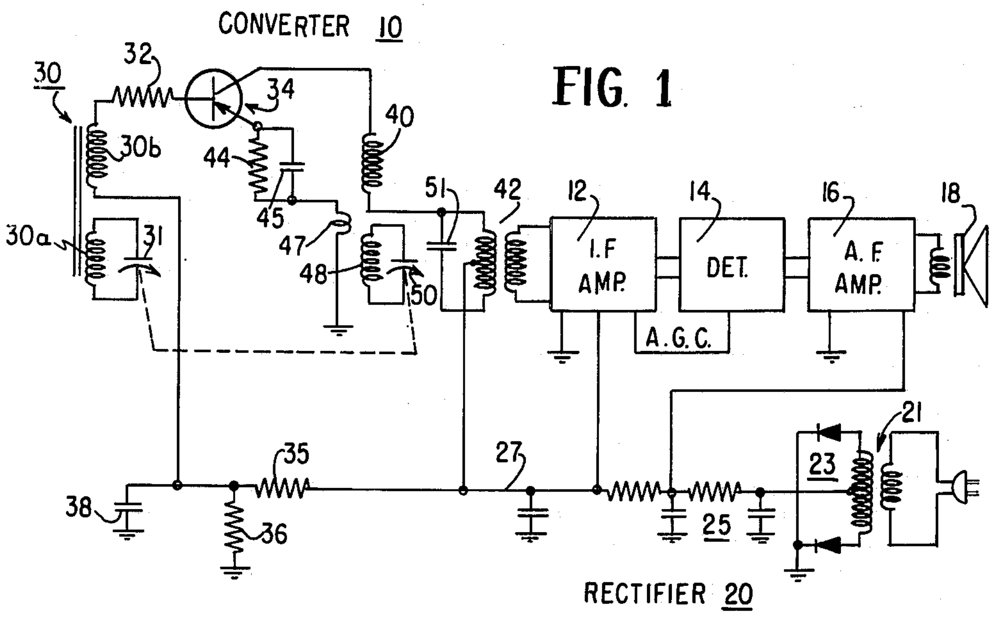
Figure 2:
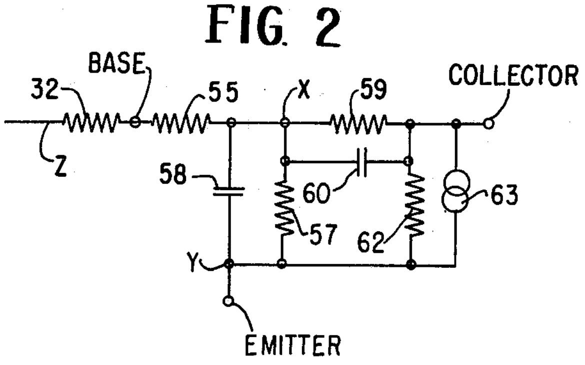

In the drawing, FIG. 1 is a diagram, in schematic and block form, showing a receiver incorporating the invention; and FIG. 2 is a schematic diagram representing the pi equivalent circuit of the transistor in the converter circuit of the receiver of FIG. 1.

In FIG. 1 the transistorized wave signal receiver includes a converter stage 10 which will select a desired signal and heterodyne the same with local oscillations to develop a signal of intermediate frequency. Further details of the operation of the converter 10 are given subsequently. The signal of intermediate frequency is applied to the IF amplifier 12 for further amplification and rejection of adjacent channel signals. The signal is then coupled to a detector 14 for demodulation of the amplitude modulated intermediate frequency signal and the resulting audio frequency signal is amplified by the amplifier 16 and applied to a loudspeaker 18. As shown in the drawing, an automatic gain control signal is applied from the detector 14 to the IF amplifier 12 in order to control the receiver gain inversely in accordance with the level of the received signal, as is common practice in receivers of this type.

A power line rectifier circuit 20 is connected to each of the circuits 10, 12 and 16 to provide a direct current operating potential therefor. Rectifier 20 includes a power transformer 21 which is adapted to be connected to an alternating current power line and a full wave rectifier network 23 to develop a D.C. potential which, for example, may be of the order of 15 volts. The rectifier circuit 20 further includes an RC filter network 25 to remove the ripple remaining after full wave rectification. Accordingly, lead 27′ will provide a relatively pure D.C. potential negative with respect to ground for operating the converter stage 10.

The converter stage 10 includes a ferrite core antenna 30 having a primary winding **30*a* which is tuned by variable capacitor 31. The secondary winding 30*b* of the antenna 30 is connected through the resistor 32 to the base electrode of the converter transistor 34. The other side of the winding 30*b* is connected to the junction of resistors 35 and 36 which are series connected between potential supply lead 27 and ground. Resistor 36 is bypassed for signals by means of capacitor 38. Accordingly, a direct current bias potential for the base of transistor 34 will be developed by potential divider 35, 36 and applied through winding 30*b* and resistor 32**, to the base electrode.

Local oscillations in the superheterodyne receiver are developed by a tunable feedback circuit connected between the collector and emitter electrodes of transistor 34. The collector electrode is series connected through an inductance coil 40 to the IF transformer 42. The emitter electrode of transistor 34 is connected through the parallel connected resistor 44 and capacitor 45 and the inductance coil 47 to ground. An inductance coil 48 is connected to a variable tuning capacitor 50 and one side of the parallel combination of coil 48 and capacitor 50 is grounded.

Inductance coils 40, 47 and 48 are inductively coupled together so that a signal from the collector of transistor 34 may be fed back to the emitter and this signal is tuned by means of the tuning circuit 48, 50. As is usual in superheterodyne receivers for reception of broadcast band signals, the local oscillator tuning capacitor 50 is ganged to the desired signal tuning capacitor 31. Local oscillators are tunable through a range which is always higher in frequency than the desired signal range by an amount exactly equal to the frequency to which the intermediate frequency amplifier 12 is tuned. Resistor 44 and capacitor 45 are series connected in the emitter circuit of transistor 34 to develop a suitable bias potential so that together with such a bias potential and the regenerative feedback from collector to emitter local oscillations will be sustained at the frequency to which the capacitor 50 and coil 48 are tuned.

The desired signal, converted to a signal of intermediate frequency, for example 455 kc., is applied to the primary winding of transformer 42 which has a tap connected to the energizing potential supplied by lead 27. In this way, operating current for the collector of transistor 34 is provided. The primary winding of transformer 42 is tuned by a capacitor 51. The secondary winding of this transformer is coupled to the intermediate frequency amplifier 12 and the remainder of the receiver utilizes the signal in the manner previously described.

It should be noted that the described receiver incorporates a converter stage to which the signal pickup means or antenna is directly connected. Furthermore, there is but a single tuned circuit for selection of the desired signal from the antenna prior to the application of the signal to the converter for conversion to IF frequency. With preselection of this type there is accordingly a possibility of passing to the converter undesired signals which are in the frequency range higher than the broadcast band where these may intermodulate with other signals and be passed through the receiver to produce spurious signal responses. It may also be seen that the rectifier circuit 20, when connected to the power line, can afford a source of signal pickup which may conduct or couple some undesirable amount of spurious signals into the converter stage. While the potential supply lead 27 is bypassed for RF frequencies, it is sometimes possible for such bypassing to be insufficient for particular signal conditions so that the transistor 34 may have applied to it high frequency signals of sufficient strength to cause the transistor 34 to respond thereto.

In order to overcome such high frequency interference, the resistor 32 is series connected between the antenna secondary winding 30*b* and the base electrode of transistor 34. This resistor has a value with respect to the capacitive reactance at the transistor base such that there is low attenuation of the desired signal while at the same time there is a reduction or "roll off" of the frequency response of the transistor 34 for frequencies above the broadcast band of 550 kc. to 1620 kc.

As shown in FIG. 2, the resistor 32 is in series with the extrinsic resistance 55 of the pi equivalent circuit of transistor 34. It will be noted that a resistance 57 also exists between resistance 55 and the emitter connection and this is shunted by a capacitor 58 representing the effective input capacitance. In addition, a resistance 59 is represented between the resistor 55 and the collector terminal of transistor 34 and resistor 59 is shunted by capacitor 60. Resistance 62 is between the collector and emitter. A generator 63 is shown between collector and emitter.

The signal actuating the transistor appears between points X and Y, whereas the signal introduced to the entire circuit appears across points Z and Y. With the introduction of resistor 32 in series with the resistance 55, the high frequency signal appearing between points X and Y has been reduced relative to lower frequency signals. The amount of reduction, of course, depends upon the values of resistances 32 and 55. In the present circuit, resistor 32 can be selected in value to improve the receiver performance in the broadcast band by reducing the strength of interfering high frequency signals applied to the transistor.

In a receiver of practical construction the values of the circuit components in converter 10 were as follows:

| | |
|---|---|
| Resistor **32** | 330 ohms. |
| Transistor **34** | 2SA72. |
| Resistor **35** | 220,000 ohms. |
| Resistor **36** | 47,000 ohms. |
| Capacitor **38** | .05 mfd. |
| Resistor **44** | 1,200 ohms. |
| Capacitor **45** | .01 mfd. |
| Potential on lead **27** | —9.2 volts. |

Accordingly, it can be seen that the above described circuit affords a simple and inexpensive means to overcome a problem of spurious signal response in a transistorized radio receiver. Cross modulation is one of the more troublesome problems in a transistorized receiver and the presently described circuit construction reduces the intensity of high frequency signals that would be capable of causing cross modulation. By the expedient described it is possible to reduce the tendency for oscillation, tweets, response to high power short wave signals, and the like.

I claim:

1. In a superheterodyne wave signal receiver, a transistor having base, emitter and collector electrodes, an output circuit connected to said collector electrode for deriving signals below a maximum frequency therefrom, a tunable antenna circuit including an inductance coil, a resistor connected between said inductance coil and said base electrode, said transistor having a given effective input capacitance between said base and emitter electrodes and an effective input resistance, said resistor having a value chosen with respect to said effective input capacitance and said input resistance to form a low pass filter to substantially reduce the level of signals above the maximum frequency between said base and emitter electrodes without substantially reducing the level of signals below the maximum frequency between such electrodes, whereby said resistor modifies the input frequency response of said transistor to reduce high frequency spurious signals therein.

2. In a superheterodyne wave signal receiver, a transistor having base, emitter and collector electrodes, an output circuit connected to said collector electrode for deriving signals below a maximum frequency therefrom, a tunable antenna circuit including an inductance coil, a resistor connected between said inductance coil and said base electrode, said transistor having a given effective input capacitance between said base and emitter electrodes, said resistor having a value chosen with respect to said effective input capacitance to substantially reduce the level of signals above the maximum frequency between said base and emitter electrodes without substantially reducing the level of signals below the maximum frequency between such electrodes, a power supply rectifier circuit to provide a direct current operating potential from a power line connected to said base electrode and to said output circuit to energize said transistor, said power supply circuit being subject to introduce spurious signals above the maximum frequency, whereby said resistor modifies the input frequency response of said transistor to reduce high frequency spurious signals therein.

3. In a superheterodyne wave signal receiver, a converter stage including a transistor having base, emitter and collector electrodes, said converter stage further including tunable feedback means coupled between said emitter and collector electrodes and an output circuit connected to said collector electrode for deriving signals below a maximum frequency therefrom, a tunable antenna circuit including an inductance coil, a resistor connected between said inductance coil and said base electrode, said transistor having a given effective input capacitance between said base and emitter electrodes, said resistor having a value chosen with respect to said effective input capacitance to substantially reduce the level of signals above the maximum frequency between said base and emitter electrodes without substantially reducing the level of signals below the maximum frequency between such electrodes, a power supply rectifier circuit to provide a direct current operating potential from a power line connected to said base electrode and to said output circuit to energize said transistor, whereby said resistor modifies the input frequency response of said transistor to reduce high frequency spurious signal response in said converter.

(References on following page)

References Cited by the Examiner

UNITED STATES PATENTS

| | | | |
|---|---|---|---|
| 1,907,653 | 5/1933 | Muth | 325—381 |
| 2,111,710 | 3/1938 | Van Loon | 325—379 |
| 2,606,286 | 8/1952 | Yearsley | 325—493 |
| 2,889,453 | 6/1959 | Stern | 325—376 |
| 2,967,236 | 1/1961 | Freedman | 325—319 |

OTHER REFERENCES

Kiver, M. S.: Transistors in Radio and Television, McGraw-Hill, N.Y., 1956; page 220.

Terman, F. E.: Radio Engineering, McGraw-Hill, N.Y., 1947, pages 364–365.

DAVID G. REDINBAUGH, *Primary Examiner.*